United States Patent
Murphy et al.

(10) Patent No.: US 6,768,844 B2
(45) Date of Patent: Jul. 27, 2004

(54) METHOD AND APPARATUS FOR EFFECTING ALIGNMENT IN AN OPTICAL APPARATUS

(75) Inventors: Daniel J. Murphy, Allen, TX (US); Robert B. Chipper, Allen, TX (US); Brent L. Sisney, Allen, TX (US); David H. Rester, Dallas, TX (US); James T. Hoggins, Plano, TX (US); James J. Hudgens, Plano, TX (US)

(73) Assignee: Raytheon Company, Lexington, MA (US)

( * ) Notice: Subject to any disclaimer, the term of this patent is extended or adjusted under 35 U.S.C. 154(b) by 315 days.

(21) Appl. No.: 09/823,606

(22) Filed: Mar. 30, 2001

(65) Prior Publication Data

US 2003/0228110 A1 Dec. 11, 2003

(51) Int. Cl.[7] .................................................. G02B 6/26
(52) U.S. Cl. ........................................ 385/52; 385/97
(58) Field of Search .............................. 385/52, 2, 8, 9, 385/14, 15, 27, 31, 33, 65, 74, 83, 97, 96, 99

(56) References Cited

U.S. PATENT DOCUMENTS

| | | | | | |
|---|---|---|---|---|---|
| 3,872,246 | A | * | 3/1975 | Schneider | 348/607 |
| 4,291,941 | A | * | 9/1981 | Melzer | 385/74 |
| 4,358,851 | A | * | 11/1982 | Scifres et al. | 372/97 |
| 4,701,011 | A | * | 10/1987 | Emkey et al. | 385/34 |
| 5,009,482 | A | * | 4/1991 | Lincoln | 385/35 |
| 5,293,438 | A | * | 3/1994 | Konno et al. | 385/35 |
| 5,336,899 | A | * | 8/1994 | Nettleton et al. | 250/559.29 |
| 5,477,323 | A | * | 12/1995 | Andrews et al. | 356/477 |
| 6,033,515 | A | | 3/2000 | Walters et al. | 156/272.8 |
| 6,275,630 | B1 | | 8/2001 | Yang et al. | 385/37 |
| 6,280,100 | B1 | * | 8/2001 | Haake | 385/73 |
| 6,316,764 | B2 | * | 11/2001 | Heffner et al. | 250/227.11 |
| 6,349,160 | B2 | * | 2/2002 | Tsien et al. | 385/35 |
| 6,360,039 | B1 | | 3/2002 | Bernard et al. | 385/33 |
| 6,445,858 | B1 | * | 9/2002 | Musk | 385/52 |
| 6,463,196 | B2 | * | 10/2002 | Shekel et al. | 385/49 |
| 2001/0014198 | A1 | | 8/2001 | Walters et al. | 385/96 |

FOREIGN PATENT DOCUMENTS

| | | |
|---|---|---|
| DE | 39 03 196 A1 | 8/1990 |
| DE | 199 27 167 A1 | 11/2000 |
| EP | 1 014 125 A2 | 6/2000 |
| JP | 59-055407 | 3/1984 |
| JP | 62-168103 | 7/1987 |

OTHER PUBLICATIONS

Copy of text and drawings of U.S. Ser. No. 10/405,807 filed Apr. 1, 2003 by inventor Brent L. Sisney for "Method and Apparatus For Separating or Combining Optical Signals Using a Dispersive Element".

* cited by examiner

Primary Examiner—Frank G. Font
Assistant Examiner—Kevin C Kianni
(74) Attorney, Agent, or Firm—Baker Botts L.L.P.

(57) ABSTRACT

An apparatus includes a support section which supports a further section, an optically transmissive substrate, and a dispersive section, the further section transporting plural signal components at respective frequencies along a path of travel. A plurality of optical fibers have ends fixedly coupled to a surface on the substrate. The dispersive section has a dispersive characteristic which deviates a direction of travel of each signal component by a respective different amount to optically map each signal component between the end portion of a respective fiber and the path of travel in the further section. During assembly, the fiber ends are moved relative to the surface while radiation passing through them is monitored, and then they are fixedly coupled to the surface in a selected position.

28 Claims, 5 Drawing Sheets

METHOD AND APPARATUS FOR EFFECTING ALIGNMENT IN AN OPTICAL APPARATUS

TECHNICAL FIELD OF THE INVENTION

This invention relates in general to optical devices and, more particularly, to optical devices which use a dispersive element to separate or combine optical signals.

BACKGROUND OF THE INVENTION

A known technique for transmitting multiple signal components as a single optical signal is known as wavelength division multiplexing (WDM). In a WDM signal, each signal component has a respective different frequency or wavelength. Each frequency or wavelength is sometimes referred to as a channel. Various devices have been developed to optically separate or combine the signal components, including multiplexers, demultiplexers and optical add/drop modules. There is a progressively growing demand in the market for devices of this type which have a high channel count, or in other words which can handle optical signals with a large number of signal components at respective different frequencies. Currently, there is a growing demand for devices capable of handling optical signals with 16 to 80 signal components, or an even greater number of signal components. There is also a demand for these devices to have a low insertion loss, and to be packaged in a compact manner.

In attempt to meet this demand, devices have been developed which utilize a dispersive element to facilitate optical separation or combination of multiple signal components. In order to reliably achieve satisfactory performance, these devices are manufactured according to extremely tight tolerances for a number of different physical and optical characteristics. An example of one such device is a demultiplexer which has the end of an input fiber and the ends of several output fibers secured at predetermined locations on a support member, and which has optical and dispersive components disposed on the support member between the input and output fibers so that each signal component of a WDM signal arriving through the input fiber is focused on the end of a respective output fiber. In this device, the support member and the optical and dispersive components are all fabricated according to extremely strict tolerences to ensure that, when the device is put into production, each signal component will be fairly accurately focused onto the end of a respective output fiber in each production device.

While pre-existing devices of this type have been generally adequate for their intended purposes, they have not been satisfactory in all respects. For example, the need for extremely tight tolerances as to a large number of physical and optical characteristics causes these devices to have a number of components which are each very expensive to manufacture. As a result, the device itself is undesirably expensive. Moreover, despite the use of tight tolerances, not every signal component ends up being accurately focused on the end of the corresponding output fiber. Consequently, characteristics like insertion loss are not always optimum, and may vary from system to system, for example where a given subset of tolerance variations offset each other in one system, but are cumulative in another system.

SUMMARY OF THE INVENTION

From the foregoing, it may be appreciated that a need has arisen for a method and apparatus that will avoid at least some of the disadvantages involved in pre-existing approaches. One form of the invention encompasses a method which involves: fixedly supporting on a support section a further section which is operable to transport radiation containing a plurality of signal components at respective different frequencies along a path of travel; fixedly supporting a dispersive section on the support section so that the signal components pass therethrough, the dispersive section having a dispersive characteristic that deviates a direction of travel of each signal component by a respective different amount so as to effect an optical mapping for each signal component between the path of travel associated with the further section and a respective further path of travel; providing a plurality of optical fibers which each correspond to a respective signal component; positioning an end of each optical fiber in the region of a respective further path of travel; for each optical fiber, causing a beam of radiation which includes the corresponding signal component to travel along one of a path of travel through that optical fiber and the path of travel associated with the further section, and to then be optically mapped by the dispersive section to the other thereof; and adjusting a position of the end of each fiber while monitoring the amount of the corresponding signal component traveling along the other of the paths of travel, until the end of that fiber is disposed in a selected position, and then fixing the end of that fiber in the selected position thereof with respect to the support section.

A different form of the invention encompasses an apparatus which involves: a first portion which includes a support section and a further section fixedly supported on the support section, the further section being operable to transport radiation containing a plurality of signal components at respective different frequencies along a path of travel; a second portion which includes a dispersive section fixedly supported on the support section so that the signal components pass therethrough, and having a dispersive characteristic that deviates a direction of travel of each signal component by a respective different amount so as to effect an optical mapping for each signal component between the path of travel associated with the further section and a respective further path of travel; a third portion which includes a plurality of optical fibers that each correspond to a respective signal component, and that each have an end which is initially positioned in the region of a respective further path of travel; a fourth portion which, for each optical fiber, is operable to cause a beam of radiation which includes the corresponding signal component to travel along one of a path of travel through that optical fiber and the path of travel associated with the further section, and to then be optically mapped by the dispersive section to the other thereof; and a fifth portion which is operable to adjust a position of the end of each fiber while monitoring the amount of the corresponding signal component traveling along the other of the paths of travel, until the end of that fiber is disposed in a selected position, and to then fix the end of that fiber in the selected position thereof with respect to the support section.

Still another form of the invention encompasses an apparatus which involves: a support section; a further section supported on the support section and operable to transport radiation containing a plurality of signal components at respective different frequencies along a path of travel; an optically transmissive substrate fixedly supported on the support section, the substrate having a surface on one side thereof; a plurality of optical fibers that each have an end portion which is fixedly coupled to the substrate with an end thereof adjacent the surface on the substrate, each optical fiber being operable to carry a respective signal component;

and a dispersive section fixedly supported on the support section at a location disposed optically between the further section and the substrate so that the signal components pass therethrough, and having a dispersive characteristic that deviates a direction of travel of each signal component by a respective different amount so as to effect an optical mapping for each signal component between the end portion of a respective optical fiber and the path of travel associated with the further section.

BRIEF DESCRIPTION OF THE DRAWINGS

A better understanding of the present invention will be realized from the detailed description which follows, taken in conjunction with the accompanying drawings, in which.

DETAILED DESCRIPTION OF THE INVENTION

Figure 1:
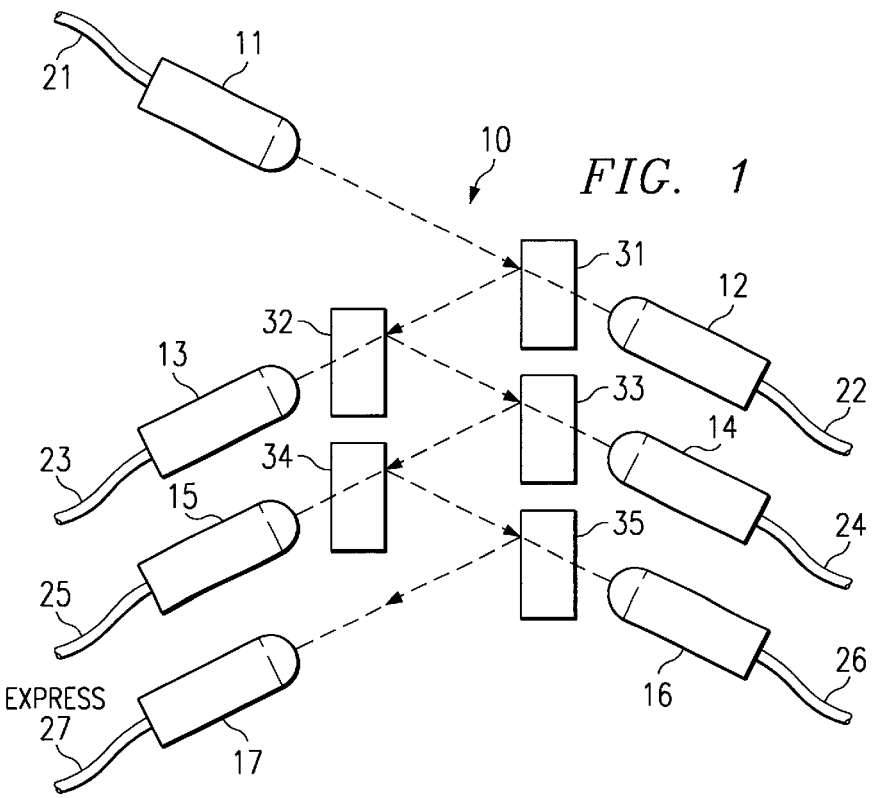
FIG. 1 is a diagrammatic view of an optical add/drop multiplexer which is part of an apparatus that is made in accord with the present invention.

FIG. 1 is a diagrammatic view of a pre-existing apparatus in the form of a demultiplexer 10 which is configured for use in a wavelength division multiplexing (WDM) system, and which embodies aspects of the present invention. For convenience, the apparatus of FIG. 1 is described here as a demultiplexer, but it will be recognized that it could alternatively be used as a multiplexer, by simply reversing the directions in which radiation travels through it.

The demultiplexer 10 includes a support member 12, which is represented diagrammatically by a broken line in FIG. 1. As discussed in more detail later, the support member 12 is made of aluminum or some other suitable material, and has on one side thereof a surface formed by a precision machining operation, such as a diamond point turning technique. The demultiplexer 10 includes an input fiber 14 which has an end portion fixedly supported on the support member 12 within a not-illustrated V-shaped groove that is part of the precision surface thereon.

The input fiber 14 carries to the demultiplexer 10 a beam of radiation that contains a plurality of signal components at respective different frequencies. Stated differently, each of the n signal components has a respective different wavelength $\lambda_1$ through $\lambda_n$. Each frequency or wavelength is also sometimes referred to as a channel. A demultiplexer of the type shown at 10 can be used for any input signal having at least two different wavelengths or channels, and is advantageous for systems having a relatively high channel count, such as 16 or more channels.

The demultiplexer 10 also includes collimating optics 16, a dispersive section 18, and focusing optics 21, which are all fixedly supported on the support member 12. In this regard, the precision machined surface on the support member 12 may have recesses or other structure that facilitate highly accurate positioning of the dispersive section 18 and the optics 16 and 21. The collimating optics 16 and the focusing optics 21 are each an optical configuration of a known type that includes several optical components, and each is therefore shown in FIG. 1 as a labeled rectangular block. The dispersive section 18 is typically one of a detraction grating, a prism, or a "grism" (where a grism is a combination of a defraction grating and a prism).

A plurality of output fibers 26 each have an end portion which is fixedly supported at a predetermined location on the support member 12, for example in a respective V-shaped groove which is not illustrated and which is part of the precision surface on the support member. The ends of the output fibers 26 are effectively disposed along a straight line. For clarity, FIG. 1 shows only three output fibers 26, but the actual number of output fibers could be smaller or larger, and could for example involve from 16 up to 80 or more output fibers.

In operation, the beam of WDM radiation with n signal components arrives through the input fiber 14, and then travels to and through the collimating optics 16.

The collimating optics converts the WDM radiation from diverging radiation into collimated radiation. This collimated radiation then travels to and passes through the dispersive section 18. The dispersive characteristic of the section 18 has a slightly different effect on each of the n signal components with different wavelengths. In particular, each signal component is deviated in its direction of travel by a slightly different amount from the direction of travel in which the collimated radiation from collimating optics 16 arrives at the dispersive section 18. Consequently, each signal component travels away from the dispersive section 18 in a slightly different direction. Each of these signal components then travels to and through the focusing optics 21, which converts each signal component from collimated radiation into focused radiation. Due to the fact that the dispersive section 18 has caused each signal component to travel in a slightly different direction, each signal component will be focused by the focusing optics 21 onto the end of a respective different output fiber 26. Thus, each of the n output fibers 26 will end up carrying a respective one of the n different signal components.

As mentioned above, the support member 12 has a precision machined surface on one side thereof. This surface includes several V-shaped grooves, each of which has the end of a respective one of the input or output fibers 14 or 26 fixedly secured therein. Further, the surface has precision recesses or other characteristics which facilitate precise positioning of the collimating optics 16, dispersive section 18 and focusing optics 21. Since the ends of the output fibers 26 are all in predetermined locations, the support member 12, collimating optics 16, dispersive section 18 and focusing optics 21 must all be manufactured to meet extremely high tolerances as to a number of different characteristics, in order to ensure that every one of the n signal components is relatively accurately focused onto the end of a respective one of the output fibers 26. As a result, they are all relatively expensive parts, which in turn causes the demultiplexer 10 to be a relatively expensive device. The reason why high tolerances are needed is explained in more detail with regard to FIG. 2.

Figure 2:
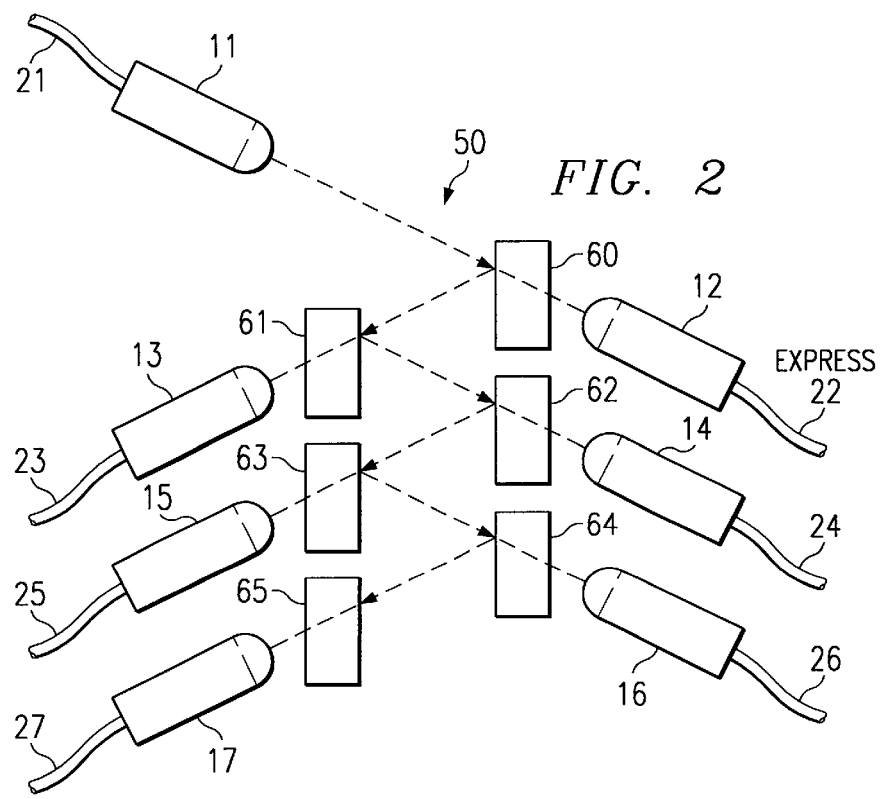
FIG. 2 is a diagrammatic view of an alternative embodiment of the multiplexer of FIG. 1.

More specifically, FIG. 2 is a diagram which shows, along a broken line A, the n signal components that have respective wavelengths $\lambda_1$ through $\lambda_n$ (where $\lambda_c$ is the wavelength of a center frequency). On a more specific level, FIG. 2 shows along line A the spatial distribution which the n signal components must have when they arrive at ends of the output fibers 26, in order for each signal component to be focused substantially accurately on the center of the associated output fiber. If strict tolerances were not maintained as to a number of different physical and optical characteristics, some or all of the signal components would not be focused on the correct output fiber.

One such characteristic is the effective focal length (EFL) of the optics. Assume for the sake of discussion that the tolerance for EFL was relaxed from a strict value, so that the actual value for EFL could vary by a greater amount from its ideal value. Also assume that the EFL is in fact decreased as far as the relaxed tolerance will allow. As shown along line B of FIG. 2, the result would be that the spacing between the focal points of the various signal components would be proportionally decreased, causing the focal points of the signal components at each end of the spectrum to move physically inwardly toward the focal point of the center wavelength $\lambda_c$. As a result, with reference to the vertical broken lines in FIG. 2, the focal points for wavelengths near the center wavelength $\lambda_c$ would still be fairly accurately focused on the correct output fibers, but the focal points for signal components at each end of the spectrum (such as the wavelengths $\lambda_1$ and $\lambda_n$) would either be focused in whole or in part on the wrong fiber, or would not be focused on any fiber at all.

Alternatively, if the EFL was increased as far as the relaxed tolerance would allow, the spacing between the focal points of the signal components would be proportionally increased, such that the focal points for the signal components at each end of the spectrum would move outwardly. The basic result would be the same, in that there would be signal components which would not be focused on the end of any output fiber, or would be focused in whole or in part on the end of the wrong output fiber. Only the signal components near the center wavelength $\lambda_c$ would still be focused on the corresponding output fibers. Consequently, given the fact that the output fibers 26 are all fixedly positioned in predetermined locations determined by V-shaped grooves in the precision surface on the support member 12, strict tolerances must be maintained as to the EFL of the optics, or else some signal components will not be focused on the end of the correct output fiber.

The same is true for other characteristics, an example of which is the dispersion impact of the dispersion section 18, or in other words the degree of dispersive effect. If the tolerance for this characteristic was relaxed so that the dispersion impact was decreased from its ideal value by the maximum amount of the relaxed tolerance, the spacing between the focal points of the different signal components would decrease proportionally, as shown along line C in FIG. 2. In particular, it will be noted that the focal point of the signal component at the wavelength $\lambda_1$ is still in approximately the correct position, but the focal points for signal components at the opposite end of the spectrum, including the wavelength $\lambda_n$, have moved substantially away from their ideal positions, and would be focused in whole or in part on the wrong fiber, or on no fiber at all.

Alternatively, if the dispersion impact was increased from its ideal value to the limit of the relaxed tolerance, the spacing between the focal points for the different signal components would tend to increase proportionally. The focal point of the signal component at the wavelength $\lambda_n$ would still in approximately the correct position, but the focal points for signal components at the opposite end of the spectrum, including the wavelength $\lambda_n$, would move away from their ideal positions in a rightward direction in FIG. 2, and would be focused in whole or in part on the wrong fiber, or on no fiber at all. Again, strict tolerances have to be maintained as to the dispersion impact of the dispersive section 18, in order to ensure that each signal component will be substantially accurately focused on the end of the corresponding output fiber 26. An example of still another such characteristic is distortion. If the tolerance for the distortion impact of the optics was relaxed, and the distortion impact was increased from its ideal value to the limit of the relaxed tolerance, the spacing between the focal points for different signal components would tend to increase in a non-linear manner, as depicted along line D in FIG. 2. This effect is somewhat similar to the effect shown in line B, except that the spacing between the focal points changes approximately linearly along line B, whereas the spacing between the focal points changes nonlinearly along line D, or in other words with a higher-order (exponential) effect. Consequently, it will be recognized that the distortion impact must also conform to strict tolerances in order to ensure that each signal component will be substantially accurately focused on the end of the corresponding output fiber 26.

For the same reason, there are a number of other physical and optical characteristics that also need to conform to strict tolerances. These include the precision machined surface on the support member 12, which determines the physical alignments of the various components supported by the support member 12, and also include proper alignment of the axis of the input fiber 14 with respect to the optical axis of other optical structure on the support member 12, where improper alignment can cause another form of distortion impact. There are still other characteristics which must conform to strict tolerances for the same reason, but which are not all identified and discussed in detail here. In addition, with respect to the fibers 14 and 26, suitable tolerances must be met as to the outside diameter of the cladding, and as to the concentricity of the core and cladding.

As mentioned above, the apparatus of FIG. 1 has been described here as a demultiplexer for purposes of convenience. However, it can alternatively function as multiplexer if the directions of radiation travel are simply reversed, such that the fibers 26 serve as input fibers through which respective signal components arrive, and the fiber 14 serves as an output fiber into which all of the signal components are directed. All of the same strict tolerances would still be needed, in order to ensure that each signal component is accurately focused on the end of the fiber 14.

The foregoing discussion relates to the embodiment of FIG. 1, in which the support member 12 has V-shaped grooves which each receive the end of a respective optical fiber 26. However, as an alternative, there could be a further member which is not illustrated, which is supported on the support member 12, and which has a plurality of V-shaped grooves which each receive the end of a respective optical fiber 26. By moving the further member relative to the support member 12, and then securing the further member in a selected position with respect to the support member 12, it is possible to simultaneously reposition all of the fibers relative to other optical structure on the support member 12. However, in this arrangement, the fibers do not move relative to each other. For the most part, therefore, issues of the type discussed above are still present, including the need for strict tolerances.

Figure 3:
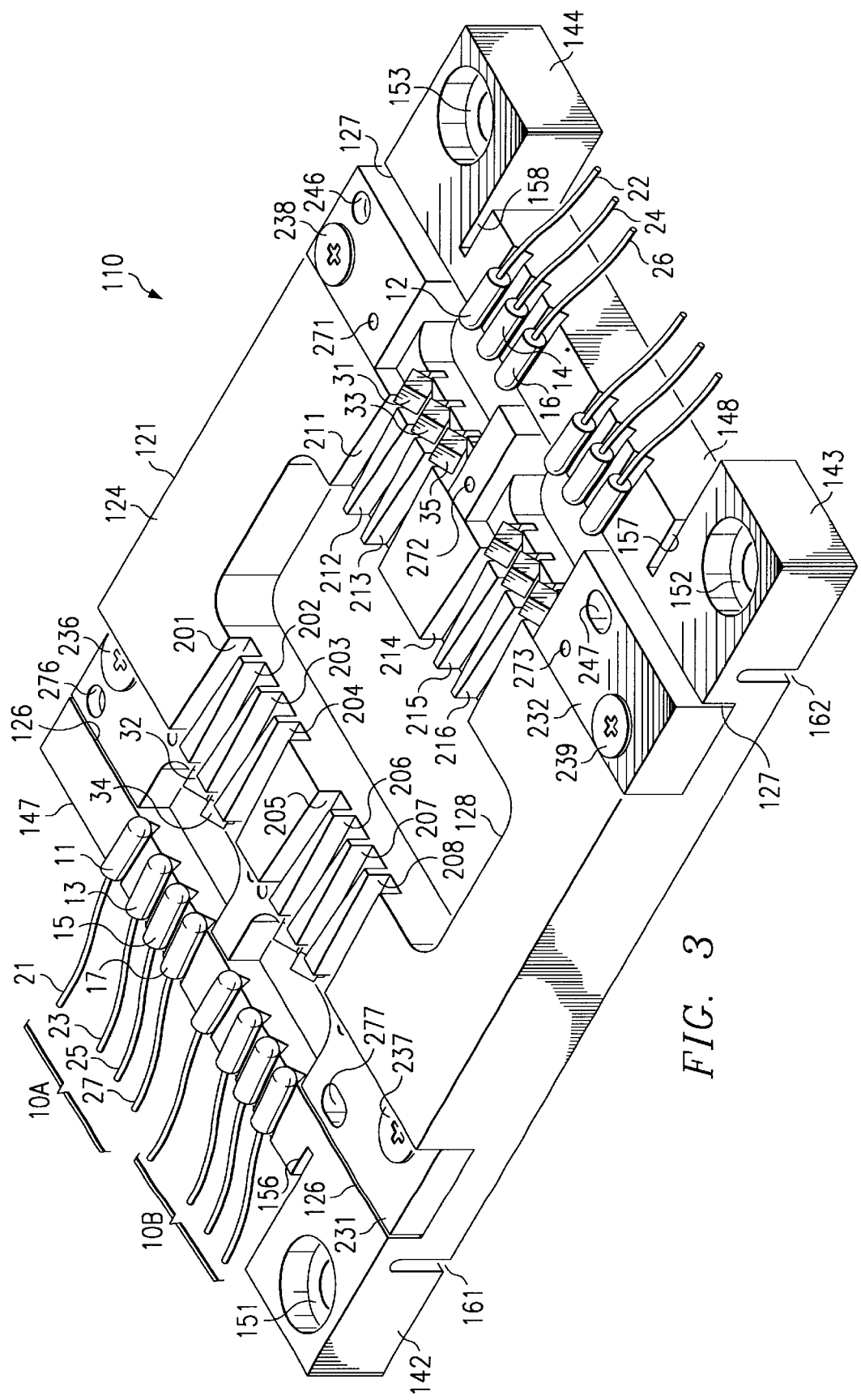
FIG. 3 is a diagrammatic perspective view of an optical add/drop multiplexer apparatus which is made in accord with the present invention, and which includes the multiplexer of FIG. 1.

FIG. 3 is a diagrammatic view similar to FIG. 1, but showing a different apparatus 60 which is also a demultiplexer for a WDM system, and which embodies aspects of the present invention. In FIG. 3, parts which are similar to parts in FIG. 1 are identified with the same reference numerals, and the following discussion focuses primarily on the differences between the demultiplexers 10 and 60.

In FIG. 3, the demultiplexer 60 includes an additional component, which is a fusion substrate 66 having a surface 67 on one side thereof. The substrate 66 is fixedly mounted on the support member 12. The substrate 66 is optically transmissive to all wavelengths of interest, and is effectively a window which has no optical power. In the embodiment of FIG. 3, the substrate 66 is made of a fused silica material, but it could alternatively be made any other suitable material. The output fibers 26 each have an end which is disposed against the surface 67, and which has been fused to the substrate 66 in a manner described later, so as to fixedly secure each output fiber 26 to the substrate 66.

When the demultiplexer 60 is being assembled, there is a point where the input fiber 14, collimating optics 16, dispersive section 18, focusing optics 21 and substrate 66 have all been physically mounted on the support member 12, but the output fibers 26 have not yet been coupled to the substrate 66. After this point, while supplying radiation containing a variety of signal components at different wavelengths through the input fiber 14, each output fiber 26 is physically moved with respect to the substrate 66 with the fiber end disposed against surface 67, until a position is found in which the amount of radiation from the associated signal component which enters that output fiber has a maximum value. The output fiber is then fused to the substrate 66 while in that position.

Figure 4:
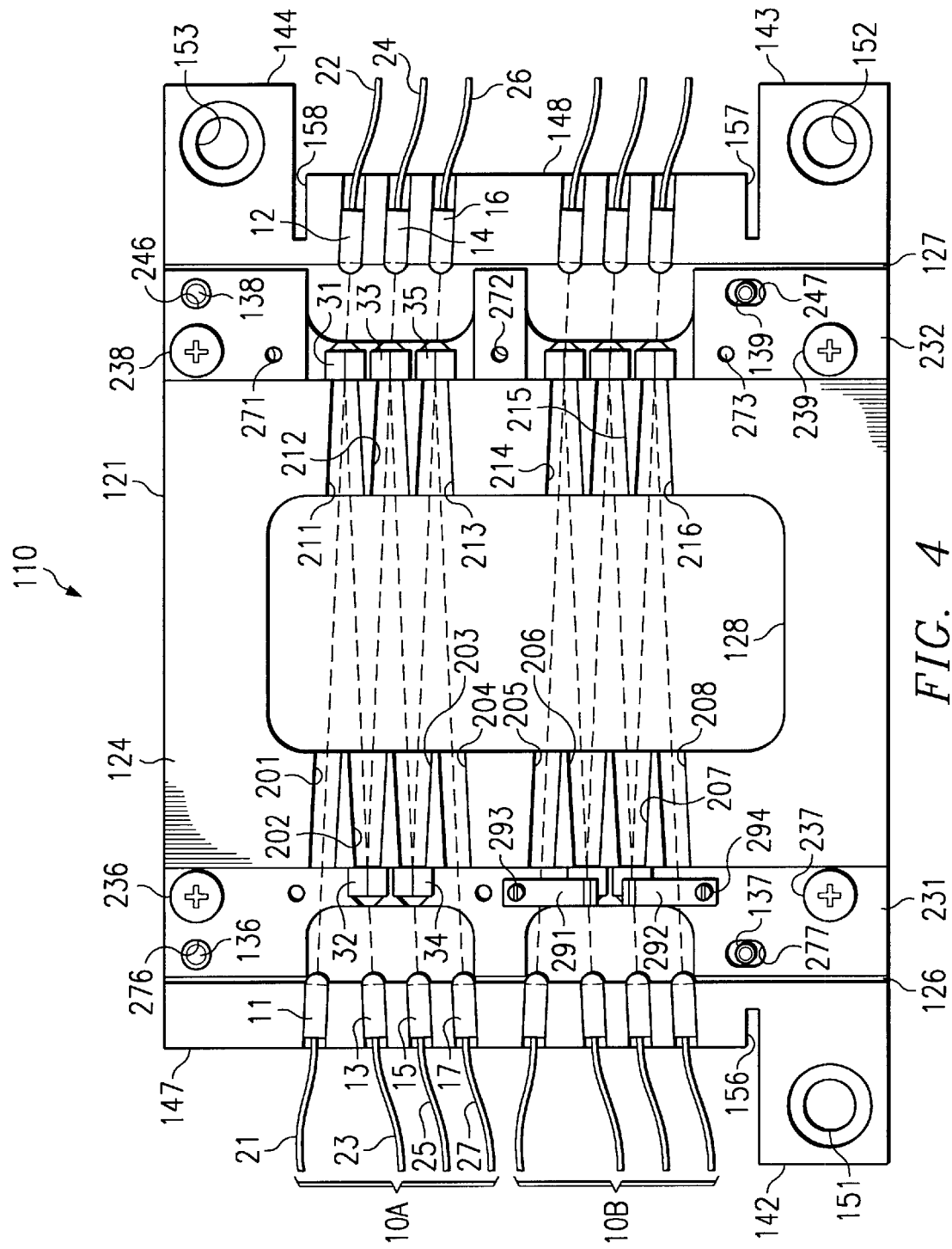
FIG. 4 is a diagrammatic top view of the multiplexer apparatus of FIG. 3.

In more detail, FIG. 4 is a fragmentary diagrammatic sectional view showing a portion of the demultiplexer 60 of FIG. 3 in the region of the substrate 66, and showing a fiber positioner 81 and a laser 82. The fiber positioner 81 is operatively coupled to one of the output fibers 26, as shown diagrammatically by a broken line 83. There are commercially available devices which are suitable for use as the fiber positioner 81, one example of which is a semi-automated fiber alignment system available under the tradename "ORION" from Newport Corporation of Irvine, Calif.

The fiber positioner 81 is capable of effecting linear movement of a fiber 26 in three orthogonal directions, including a first direction or axis which is vertical and substantially parallel to surface 67, a second direction or axis which is horizontal and substantially parallel to the surface 67, and a third direction or axis which is horizontal and substantially perpendicular to the surface 67. As a practical matter, after the fiber positioner 81 has moved the proximal end of the fiber 26 until it is closely adjacent the surface 67, virtually all of the subsequent positioning movement occurs along the first and second axes. The fiber positioner 81 can monitor the amount of radiation which passes through the fiber 26 to its distal end, as indicated diagrammatically by a broken line 86, while the fiber positioner 81 is physically moving the proximal end of the fiber 26 adjacent the surface 67 on the substrate 66.

The fiber positioner 81 has the capability to position the fiber 26 according to a selected criteria.

In the disclosed embodiment, the selected criteria is to position the fiber 26 so that it receives the maximum amount of available radiation at the wavelength of the corresponding signal component. When the fiber positioner 81 has positioned the fiber 26 so as to satisfy this selected criteria, the fiber positioner 81 enables the laser 82, as indicated diagrammatically at 87. The laser 82 then directs a laser beam 88 onto the end of fiber 26 and onto the adjacent portion of the surface 67. The laser beam 88 has the effect of fusing the end of the fiber 26 to the surface 67 on the substrate 66, so as to fixedly fasten them together. There are commercially available devices which are suitable for use as the laser 82, one example of which is a laser available as model J48 -1 W from Synrad Inc. of Mukilteo, Wash. In the disclosed embodiment, the fiber positioner 81 and laser 82 automatically carry out the positioning and fusing of the end of each fiber 26 with respect to the surface 67 on the substrate 66.

After the end of each fiber 26 has been fused to the substrate 66, a small quantity of a known adhesive 91 is applied on the surface 67 so as to surround the end portion of the fiber 66. After this adhesive sets, it adds mechanical strength to the connection between the fiber 26 and the substrate 66, and serves to reduce relative movement between them that might sever the laser-fused connection. The adhesive 91 does not affect the optical operation of the fiber 26 or the substrate 66. In the disclosed embodiment, the output fibers 26 are all fused to the substrate 66 before any of the adhesive 91 is applied. Then, a quantity of the adhesive 91 is applied in a single operation for all of the output fibers 26.

Although the foregoing discussion of FIG. 4 is directed to the approach of fusing each fiber 26 to the substrate 66 with a laser beam, with or without the subsequent application of an adhesive, the present invention is not limited to laser fusion, and encompasses alternative coupling techniques, such as using just a suitable adhesive to couple the fiber and substrate, without any fusing of the fiber and substrate.

One of the advantages of the demultiplexer 60 of FIG. 3 is that the support member 12, the collimated optics 16, the dispersive section 18, and the focusing optics 21 do not need to conform to tolerances as strict as their counterparts in the embodiment of FIG. 1. As discussed above in association with FIG. 2, relaxed tolerances mean that the focal points for the various signal components may tend to move away from the ideal positions shown along line A in FIG. 2. In fact, the actual location of the focal point for each signal component may be influenced by tolerances for several charactersitics, such as effective focal length, dispersion impact, physical positioning and alignment of the components, various types of distortion impact, or other factors. However, using the fiber positioning and fusion technique discussed above in association with FIG. 4, each output fiber 26 in FIG. 3 will be accurately aligned with the actual focal point of the radiation for the corresponding signal component, despite the fact that the position of that focal point may have been moved away from its ideal position as a result of relaxed tolerances for several different characteristics.

As a result, the demultiplexer 60 of FIG. 3 is substantially cheaper to manufacture than the demultiplexer 10 of FIG. 1, because most of the components in FIG. 3 are made with substantially reduced tolerance requirements. Further, each output fiber 26 in the demultiplexer 60 will carry the maximum 5 available radiation from the corresponding signal component, because each fiber is uniquely aligned with the focal point of that signal component. In contrast, not every output fiber in the demultiplexer 10 of FIG. 1 will receive the maximum amount of available radiation for its corresponding signal component.

Figure 5:
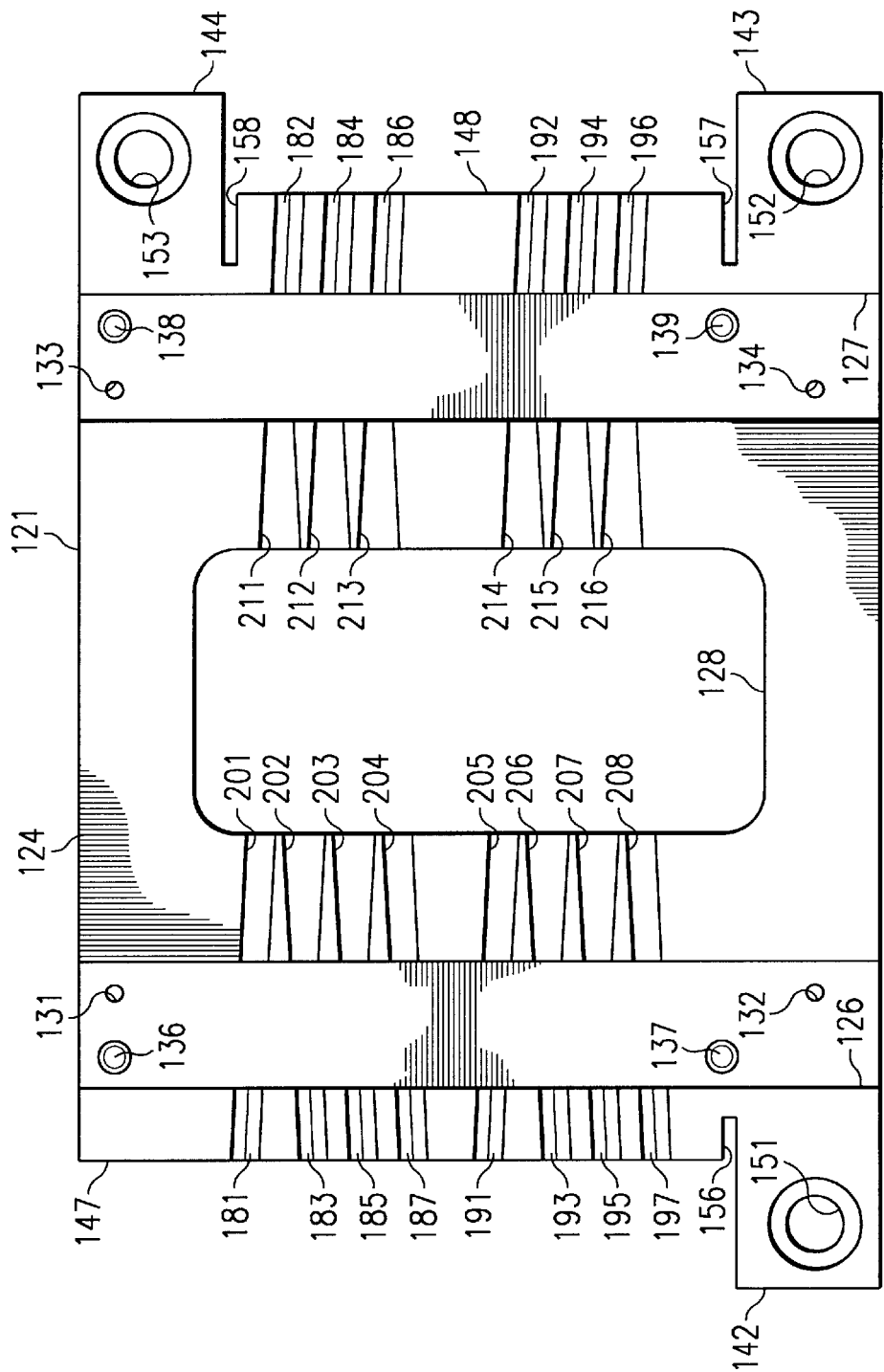
FIG. 5 is a diagrammatic top view of a base member which is a component of the multiplexer apparatus of FIG. 3.

FIG. 5 is a diagrammatic fragmentary view of an alternative embodiment of part of the demultiplexer 60 of FIG. 3. More specifically, the substrate 66 in the demultiplexer 60 of FIG. 3 has a surface 67 thereon which is flat. In contrast, FIG. 5 shows a substrate 101, which is similar to the substrate 66, except that it has a surface 102 that is curved rather than flat. The curvature of the surface 102 is exaggerated in FIG. 5, so that the curvature will be more clearly visible. The surface 102 has a curvature which is appropriate for the associated optics, and which may for example be cylindrical, spherical, aspherical, or some other appropriate shape. It will be noted that the output fibers 26 in FIG. 5 are not parallel to each other. Instead, each fiber extends approximately perpendicular to an imaginary plane 106 which is tangential to the surface 102 at the point where the fiber 26 is fused to the surface 102.

The use of the curved surface 102 provides a further advantage. In particular, in order to use a flat surface such as that shown at 67 in FIG. 3, the optical components at 16, 18 and 21 need to produce a field at the surface 67 which is substantially flat. In contrast, the optics associated with the embodiment of FIG. 5 can produce a field which has a degree of curvature. When the optics produce a curved field, they can be implemented with fewer and/or cheaper components than would be needed to produce a flat field, and thus at lower cost. Although the embodiment of FIG. 5 is described here as a demultiplexer for purposes of convenience, it will be recognized that it can alternatively function as a multiplexer, by simply reversing the directions in which radiation travels through it.

Figure 6:
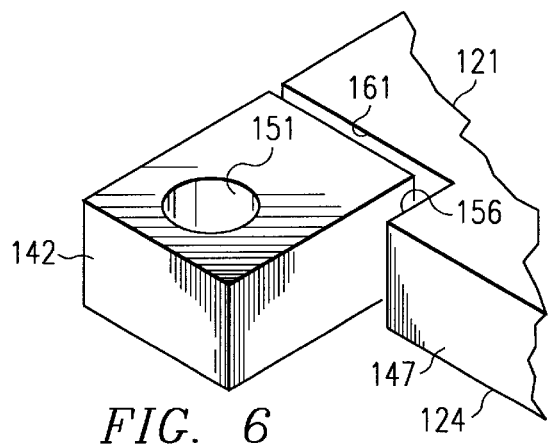
FIG. 6 is a diagrammatic fragmentary perspective view of a portion of the base member of FIG. 5, with the base member turned upside down.

FIG. 6 is a diagrammatic view of an apparatus which is a demultiplexer 210, and which is an alternative embodiment of the demultiplexer 60 of FIG. 3. For convenience, this apparatus is described as a demultiplexer, but it can alternatively function as a multiplexer, by reversing the directions of radiation travel. The demultiplexer 210 includes a fusion substrate 212 with a surface 213, and includes a plurality of fibers 216 which each have one end fused to the surface 213 of the substrate 212. All but one of the fibers 216 are visible in FIG. 6. The fibers which are visible in FIG. 6 are the output fibers. For clarity, FIG. 6 shows only 9 output fibers, but the actual number of output fibers could be larger or smaller. The fiber which is not visible in FIG. 6 is an input fiber, and is located directly behind the center output fiber.

The demultiplexer 210 further includes collimating/focusing optics 221, and a dispersive section 223. The optics 221 includes an assembly of three lenses 226–228. The dispersive section 223 is a grism which includes two prisms 231 and 232, and a volume phase grating 233 disposed between the prisms. The prisms 231–232 and the volume phase grating 233 are components of a known type. A reflective surface 236 is provided on a side of the prism 232 which is opposite from the volume phase grating 233.

In operation, radiation arrives through the input fiber, which as discussed above is the only fiber 216 that is not visible in FIG. 6. This radiation contains a plurality of signal components at respective different frequencies, and travels to the optics 221. The optics 221 collimate this diverging radiation. The radiation then travels to the dispersive section 223, where the prisms 231–232 and the volume phase grating 233 redirect the various signal components having different wavelengths so that these signal components travel at different angles. Those signal components are then reflected by the reflective surface 236, and pass back through the prisms 231–232 and the grating 233 a second time, which increases the dispersion effect by increasing the angles between the signal components. The signal components traveling in various different directions then pass back through the optics 221, which serves to focus each signal component on the end of a respective one of the output fibers at 216.

During fabrication of the demultiplexer 210, the substrate 212, optics 221 and dispersive section 223 are mounted on a not-illustrated support member, and the end of the input fiber is then fused to the substrate 212. An input signal with multiple signal components is then supplied through the input fiber, and then each of the output fibers is positioned and fused to the substrate 212, in a manner similar to that described above in association with FIG. 4.

The present invention provides a number of advantages. One such advantage is that components such as the support member, optics and dispersive section can have relaxed tolerances for a number of characteristics, or can be implemented with a reduced number of components, which can significantly reduce the number and/or cost of individual components, and can thus reduce the cost of the overall apparatus. Further, even though tolerances are relaxed and/or the number of components may be reduced, each output fiber carries the maximum possible radiation for each signal component supplied to it, thereby providing a level of efficiency which is as good as, or superior to, the efficiency of pre-existing devices. The invention is particularly advantageous in a situation where a signal has a large number of signal components, for example more than sixteen signal components. The invention is advantageous when applied in a multiplexer or demultiplexer for such a signal with more then sixteen signal components.

Although selected embodiments have been illustrated and described in detail, it will be understood that various substitutions and alterations are possible without departing from the spirit and scope of the present invention, as defined by the following claims.

What is claimed is:

1. A method, comprising the steps of:

fixedly mounting first and second optical elements in respective predetermined operational positions on a support member;

transmitting radiation along an optical path so that the radiation is optically influenced by said first optical element, thereafter reaches and is optically influenced by said second optical element, and thereafter reaches an end portion of an optical fiber;

adjusting a position of said end portion with respect to said second optical element while monitoring the amount of the radiation from said optical path which enters said end portion, until said end portion is disposed in a selected position with respect to said second optical element; and thereafter fixing said end portion in said selected position with respect to said second optical element;

including the step of selecting as said first optical element a filter which is transmissive to a portion of the radiation traveling along said optical path and which reflects a portion of the radiation traveling along said optical path;

including the step of configuring said support member to include a base member and a further member which is fixedly supported on said base member; and including the step of supporting said filter on said further member and said second optical element on said base member.

2. A method, comprising the steps of:
fixedly mounting first and second optical elements in respective predetermined operational positions on a support member;
transmitting radiation along an optical path so that the radiation is optically influenced by said first optical element, thereafter reaches and is optically influenced by said second optical element, and thereafter reaches an end portion of an optical fiber;
adjusting a position of said end portion with respect to said second optical element while monitoring the amount of the radiation from said optical path which enters said end portion, until said end portion is disposed in a selected position with respect to said second optical element; and
thereafter fixing said end portion in said selected position with respect to said second optical element, wherein said fixing step is carried out by fixedly securing said end portion to a surface of said second optical element.

3. A method according to claim 2, including the step of selecting a single mode fiber as said optical fiber.

4. A method according to claim 2, including the step of selecting as said first optical element a filter which is transmissive to a portion of the radiation traveling along said optical path and which reflects a portion of the radiation traveling along said optical path.

5. A method according to claim 4, including the step of selecting as said filter one of a grid filter and an band select filter.

6. A method according to claim 2, including the step of configuring said second optical element to include a lens.

7. A method according to claim 2, including the step of configuring said second optical element to include a collimating lens of approximately cylindrical shape which has at one end an approximately flat surface to which said end portion is fixed during said fixing step, and which focuses radiation that enters said collimating lens.

8. A method according to claim 7, wherein said collimating lens is of substantially uniform composition, and has at an end thereof opposite from said approximately flat surface a curved surface which effects said focusing of the radiation entering said collimating lens.

9. A method according to claim 7, wherein said collimating lens is a gradient index (GRIN) lens which has a composition that varies in a manner so as to effect said focusing of the radiation entering said collimating lens.

10. A method according to claim 2, wherein said fixing step is carried out by using a laser beam to fuse said end portion to said surface of said second optical element.

11. A method according to claim 2, including after said fixing step the further step of applying a quantity of an adhesive in contact with surfaces of said end portion and said optical element which are adjacent a region where said end portion and said second optical element are secured together.

12. A method according to claim 2, wherein said fixing step is carried out by using an arc fusing arrangement to fuse said end portion to said surface of said second optical element.

13. A method according to claim 12, including after said fixing step the further step of applying a quantity of an adhesive in contact with surfaces of said end portion and said optical element which are adjacent a region where said end portion and said second optical element are secured together.

14. A method according to claim 2, wherein said fixing step is carried out by using an adhesive to secure said end portion to said surface of said second optical element.

15. A method according to claim 2, including prior to said mounting step the step of fabricating said support member with a V-shaped groove therein, and wherein said mounting step includes the step of placing said second optical element in said groove.

16. A method according to claim 15, wherein said fabricating step includes the step of carrying out diamond point turning on surfaces within said groove.

17. A method according to claim 15, wherein said fabricating step includes the step of carrying out precision grinding of surfaces within said groove.

18. A method according to claim 15, wherein said fabricating step includes the step of using precision injection molding to form said support member, including surfaces within said grooves.

19. A method according to claim 2, including the step of configuring said support member to have first and second sections with a slot therebetween, and configuring said first section to include structure operable to facilitate fastening of said support member to another part, and wherein said step of fixedly mounting said optical element is carried out by mounting said optical element on said second section of said support member.

20. A method according to claim 2, wherein said mounting step includes the step of mounting a third optical element in a predetermined operational position on said support member;
wherein said transmitting step is carried out so that a portion of the radiation traveling along said optical path is optically influenced by said first optical element to travel to said third optical element rather than to said second optical element and to be influenced by said third optical element and thereafter reach an end portion of a further optical fiber;
including the step of adjusting a position of said end portion of said further optical fiber with respect to said third optical element while monitoring the amount of the radiation from said optical path which enters said end portion of said further optical fiber, until said end portion of said further optical fiber is disposed in a selected position with respect to said third optical element; and
thereafter fixing said end portion of said further optical fiber in said selected position thereof with respect to said third optical element.

21. A method according claim 20, including the steps of configuring said first optical element to include a filter, and configuring said second and third optical elements to each include a collimating lens.

22. A method according to claim 20, wherein said steps of adjusting and fixing one said end portion relative to said third optical element are carried out prior to said steps of adjusting and fixing the other said end portion relative to said optical element; and
wherein said step of adjusting said other end portion is carried out so that the amount of radiation entering said other end portion in said selected position thereof is substantially equal to the amount of radiation entering said one end portion in said selected position thereof.

23. A method according to claim 2, wherein said adjusting step includes the step of keeping said end portion oriented to extend parallel to a selected direction throughout said movement of said end portion relative to said optical element.

24. A method according to claim 2, wherein said adjusting step is carried out by moving said end portion relative to said second optical element during said monitoring so as to identify a relative position thereof which is said selected position and in which the amount of the radiation entering said end portion from said optical path satisfies a criteria.

25. A method according to claim 24, wherein said criteria includes positioning said end portion so as to maximize the amount of the radiation from said optical path that enters said end portion.

26. A method according to claim 24, wherein said criteria includes positioning said end portion so that a preselected amount of the radiation from said optical path enters said end portion.

27. A method according to claim 24, wherein said adjusting and monitoring steps are carried out automatically.

28. A method, comprising the steps of:

fixedly mounting first and second optical elements in respective predetermined operational positions on a support member;

transmitting radiation along an optical path so that the radiation is optically influenced by said first optical element, thereafter reaches and is optically influenced by said second optical element, and thereafter reaches an end portion of an optical fiber;

adjusting a position of said end portion with respect to said second optical element while monitoring the amount of the radiation from said optical path which enters said end portion, until said end portion is disposed in a selected position with respect to said second optical element; and thereafter fixing said end portion in said selected position with respect to said second optical element;

including prior to said mounting step the step of fabricating said support member with a V-shaped groove therein;

wherein said mounting step includes the step of placing said second optical element in said groove; and wherein said step of fixedly mounting said second optical element in said groove includes the step of using in association with said second optical element one of an adhesive and a leaf spring having a first end fixedly supported on said support member and a second end engaging said second optical element.

* * * * *

UNITED STATES PATENT AND TRADEMARK OFFICE
CERTIFICATE OF CORRECTION

| | |
|---|---|
| PATENT NO. | : 6,768,844 B2 |
| APPLICATION NO. | : 09/823606 |
| DATED | : July 27, 2004 |
| INVENTOR(S) | : Murphy et al. |

It is certified that error appears in the above-identified patent and that said Letters Patent is hereby corrected as shown below:

PLEASE DELETE THE TITLE PAGE AND REPLACE WITH THE ATTACHED TITLE PAGE.

PLEASE DELETE THE SPECIFICATION AND CLAIMS; COLUMNS 1 THROUGH 16 IN IT'S ENTIRITY AND INSERT THE ATTACH SPECIFICATION AND CLAIMS COLUMNS 1 THROUGH 16 AS FOLLOWS.

Signed and Sealed this

Twelfth Day of June, 2007

JON W. DUDAS
*Director of the United States Patent and Trademark Office*

(12) United States Patent
Murphy et al.

(10) Patent No.: US 6,768,844 B2
(45) Date of Patent: Jul. 27, 2004

(54) METHOD AND APPARATUS FOR EFFECTING ALIGNMENT IN AN OPTICAL APPARATUS

(75) Inventors: Daniel J. Murphy, Allen, TX (US);
Robert B. Chipper, Allen, TX (US);
Brent L. Sisney, Allen, TX (US);
David H. Rester, Dallas, TX (US);
James T. Hoggins, Plano, TX (US);
James J. Hudgens, Plano, TX (US)

(73) Assignee: Raytheon Company, Lexington, MA (US)

(*) Notice: Subject to any disclaimer, the term of this patent is extended or adjusted under 35 U.S.C. 154(b) by 315 days.

(21) Appl. No.: 09/823,606

(22) Filed: Mar. 30, 2001

(65) Prior Publication Data

US 2003/0228110 A1 Dec. 11, 2003

(51) Int. Cl.$^7$ .................................. G02B 6/26
(52) U.S. Cl. ............................... 385/52; 385/97
(58) Field of Search ............................. 385/52, 2, 8, 9, 385/14, 15, 27, 31, 33, 65, 24, 83, 97, 96, 385/99

(56) References Cited

U.S. PATENT DOCUMENTS

| | | | | |
|---|---|---|---|---|
| 3,872,246 A | * | 3/1975 | Schneider | 348/607 |
| 4,291,941 A | * | 9/1981 | Melzer | 385/74 |
| 4,358,851 A | * | 11/1982 | Scifres et al. | 372/97 |
| 4,701,011 A | * | 10/1987 | Emkey et al. | 385/34 |
| 5,009,482 A | * | 4/1991 | Lincoln | 385/35 |
| 5,293,438 A | * | 3/1994 | Konno et al. | 385/35 |
| 5,336,899 A | * | 8/1994 | Nettleton et al. | 250/559.29 |
| 5,477,323 A | * | 12/1995 | Andrews et al. | 356/477 |
| 6,033,515 A | | 3/2000 | Walters et al. | 156/272.8 |
| 6,275,630 B1 | | 8/2001 | Yang et al. | 385/37 |
| 6,280,100 B1 | * | 8/2001 | Haake | 385/73 |
| 6,316,764 B1 | * | 11/2001 | Heffner et al. | 250/227.11 |
| 6,349,160 B1 | * | 2/2002 | Tsien et al. | 385/35 |
| 6,360,039 B1 | | 3/2002 | Bernard et al. | 385/33 |
| 6,445,858 B1 | * | 9/2002 | Musk | 385/52 |
| 6,463,196 B1 | * | 10/2002 | Shekel et al. | 385/49 |
| 2001/0014198 A1 | | 8/2001 | Walters et al. | 385/96 |

FOREIGN PATENT DOCUMENTS

| | | |
|---|---|---|
| DE | 39 03 196 A1 | 8/1990 |
| DE | 199 27 167 A1 | 11/2000 |
| EP | 1 014 125 A2 | 6/2000 |
| JP | 59-055407 | 3/1984 |
| JP | 62-168103 | 7/1987 |

OTHER PUBLICATIONS

Copy of text and drawings of U.S. Appl. No. 10/405,807 filed Apr. 1, 2003 by inventor Brent L. Sisney for "Method and Apparatus For Separating or Combining Optical Signals Using a Dispersive Element".

* cited by examiner

*Primary Examiner*—Frank G. Font
*Assistant Examiner*—Kevin C Kianni
(74) *Attorney, Agent, or Firm*—Baker Botts L.L.P.

(57) ABSTRACT

An optical apparatus (110) includes a base member (121) with a plurality of grooves (181–187, 191–197), and includes a respective lens (11–17) fixedly mounted in each groove. Optical filters (31–35) are mounted on the support member in predetermined locations. One such lens is fixedly secured to an input optical fiber (21), and the input fiber is used to introduce radiation into the apparatus. Several output optical fibers (22–27) are successively positioned in relation to respective lenses by a fiber positioner (302), which monitors the amount of radiation passing through the fiber being positioned, and then causes a laser (303) to fuse the fiber end to the associated lens in a selected position.

28 Claims, 5 Drawing Sheets

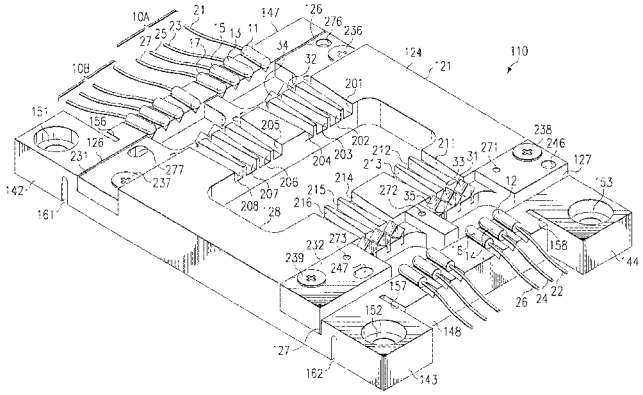

METHOD AND APPARATUS FOR EFFECTING ALIGNMENT IN AN OPTICAL APPARATUS

TECHNICAL FIELD OF THE INVENTION

This invention relates in general to optical devices and, more particularly, to alignment of optical fibers relative to other components in such optical devices.

BACKGROUND OF THE INVENTION

One existing type of optical device is an optical add/drop multiplexer (OADM), which has several collimating lenses and several filters, and which has an input fiber and several output fibers that are each physically coupled to a respective collimating lens. Optical radiation is supplied to the OADM through the input fiber and its associated lens, and impinges on the first of the filters, which reflects a portion of the radiation and passes a further portion of the radiation to a lens associated with one of the output fibers. The reflected portion of the radiation travels to another of the filters, which reflects a portion of that radiation and passes another portion of it to another lens associated with another output fiber. This sequence may continue for several more filters, lenses and output fibers.

In a known approach for manufacturing an optical device of this type, each output fiber is physically and optically coupled to its associated lens before the lenses are installed into a support arrangement which maintains them in an operational configuration. As a practical matter, the filters used in these devices are not ideal. For example, the filters may have surfaces on opposite sides thereof which are not parallel, and which thus produce a small amount of refraction in the radiation which passes therethrough. Due to this refraction, radiation which has passed through the filter travels away from it along a path which has a small angle with respect to the path that this radiation would have followed if the filter conformed to ideal characteristics.

In order to compensate for the refraction of this radiation, various techniques are used to permit independent adjustment of the lenses for each of the output fibers relative to the member which supports them, so that each such lens accurately focuses radiation on an end of the output fiber associated with it. In general, this approach involves the need for four degrees of freedom in the positioning of each such lens, including linear movement parallel to each of two translational axes that are normal to each other and to the optical axis of the collimating lens, and also pivotal movement about these two translational axes. These four degrees of freedom make accurate alignment relatively difficult, especially since collimating lenses are often more sensitive to rotational movement than to linear movement by a factor of approximately 3. Moreover, once alignment is obtained, it may be difficult to maintain it through environmental conditions such as vibration and temperature changes. Another consideration is the fact that this traditional approach involves a significant amount of manual labor and is thus expensive and time consuming in a production environment.

SUMMARY OF THE INVENTION

From the foregoing, it may be appreciated that a need has arisen for a technique for effecting alignment of optical parts in an optical apparatus. According to the present invention, a technique is provided to address this need, and involves: fixedly mounting first and second optical elements in respective predetermined operational positions on a support member; transmitting radiation along an optical path so that the radiation is optically influenced by the first optical element, thereafter reaches and is optically influenced by the second optical element, and thereafter reaches an end portion of an optical fiber; adjusting a position of the end portion with respect to the second optical element while monitoring the amount of radiation from the optical path which enters the end portion, until the end portion is disposed in a selected position with respect to the second optical element; and thereafter fixing the end portion in the selected position with respect to the second optical element.

BRIEF DESCRIPTION OF THE DRAWINGS

Figure 7:
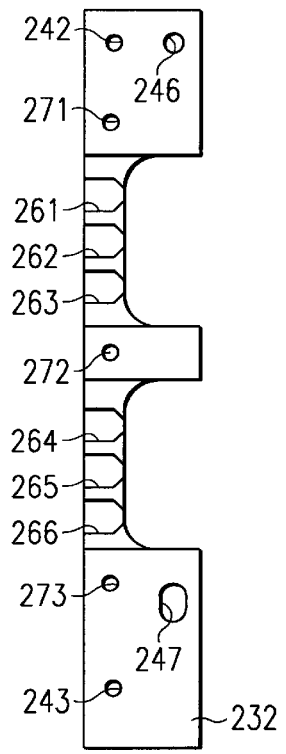
FIG. 7 is a diagrammatic top view of a filter tray which is a component of the multiplexer apparatus of FIG. 3.
Figure 8:
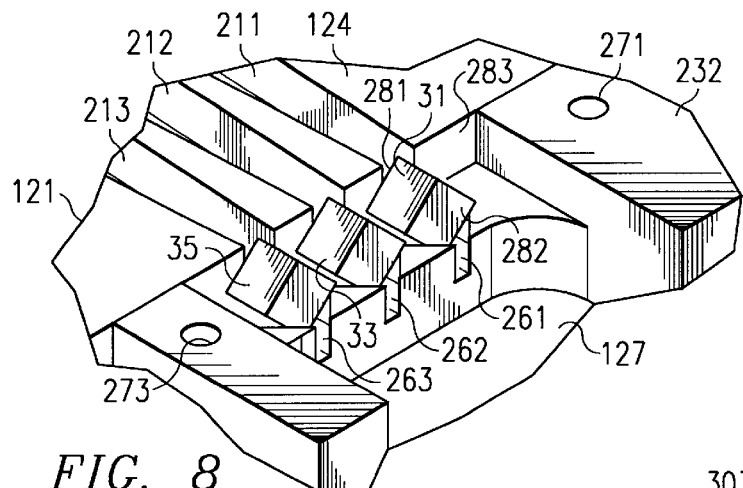
FIG. 8 is a diagrammatic fragmentary perspective view showing a portion of the multiplexer apparatus of FIG. 3 in an enlarged scale.
Figure 9:
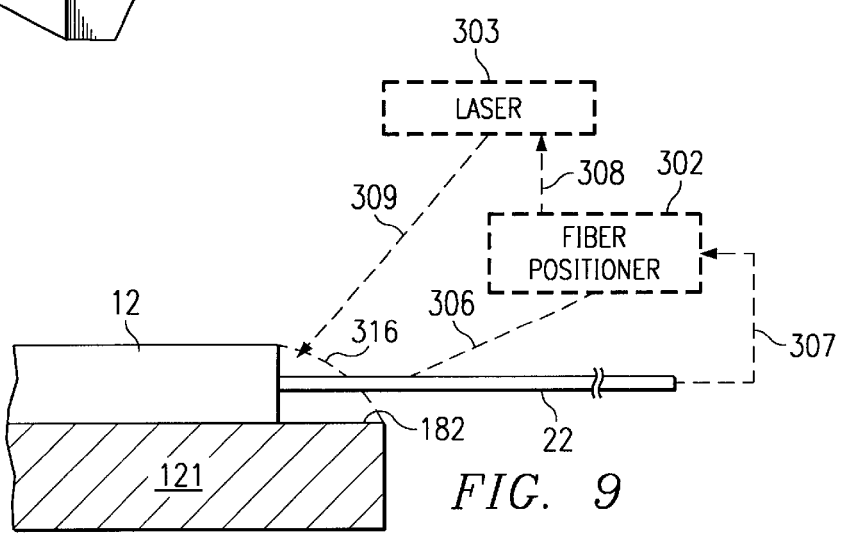
FIG. 9 is a diagrammatic view of a portion of the multiplexer apparatus of FIG. 3, together with a fiber positioner and a laser.

A better understanding of present invention will be realized from the detailed description which follows, taken in conjunction with the accompanying drawings, in which:

FIG. 1 is a diagrammatic view of an optical add/drop multiplexer which is part of an apparatus that is made in accord with the present invention;

FIG. 2 is a diagrammatic view of an alternative embodiment of the multiplexer of FIG. 1;

FIG. 3 is a diagrammatic perspective view of an optical add/drop multiplexer apparatus which is made in accord with the present invention, and which includes the multiplexer of FIG. 1;

FIG. 4 is a diagrammatic top view of the multiplexer apparatus of FIG. 3;

FIG. 5 is a diagrammatic top view of a base member which is a component of the multiplexer apparatus of FIG. 3;

FIG. 6 is a diagrammatic fragmentary perspective view of a portion of the base member of FIG. 5, with the base member turned upside down;

FIG. 7 is a diagrammatic top view of a filter tray which is a component of the multiplexer apparatus of FIG. 3;

FIG. 8 is a diagrammatic fragmentary perspective view showing a portion of the multiplexer apparatus of FIG. 3 in an enlarged scale; and FIG. 9 is a diagrammatic view of a portion of the multiplexer apparatus of FIG. 3, together with a fiber positioner and a laser.

DETAILED DESCRIPTION OF THE INVENTION

FIG. 1 is diagrammatic view of an optical add/drop multiplexer (OADM) 10, which is described in more detail later, and which is part of an apparatus made in accord with the present invention. The OADM 10 is discussed herein in a configuration in which it functions as a drop multiplexer, but it will be recognized from the following discussion that it can alternatively function as an add multiplexer without any structural changes by simply using the input as an output and each output as an input.

The OADM 10 includes seven collimating lenses 11–17. In the disclosed embodiment, each of the lenses 11–17 is an approximately cylindrical optical element made of fused silica with a uniform composition. At the outer end of each lens 11–17 in FIG. 1, there is a substantially flat end surface. Each of the lenses 11–17 has a curved surface at the inner end thereof in FIG. 1, the curvature of these surfaces being exaggerated in FIG. 1 so as to be clearly visible and thus facilitate an understanding of the present invention. The

```
ERROR: interrupt
OFFENDING COMMAND: ]

STACK:

[0 ]
1
false
false
2302
1252
1
2
2
8
1
2
```